United States Patent [19]

Fergason

[11] Patent Number: 4,815,826
[45] Date of Patent: * Mar. 28, 1989

[54] COLORED ENCAPSULATED LIQUID CRYSTAL APPARATUS USING ENHANCED SCATTERING, FLUORESCENT DYE AND DIELECTRIC THIN FILMS

[75] Inventor: James L. Fergason, Kent, Ohio

[73] Assignee: Manchester R & D Partnership, Pepper Pike, Ohio

[*] Notice: The portion of the term of this patent subsequent to Mar. 6, 2001 has been disclaimed.

[21] Appl. No.: 840,850

[22] Filed: Mar. 18, 1986

Related U.S. Application Data

[62] Division of Ser. No. 480,466, Mar. 30, 1983, Pat. No. 4,596,445.

[51] Int. Cl.$^4$ .............................................. G02F 1/13
[52] U.S. Cl. ............................. 350/339 F; 350/334; 350/350 F
[58] Field of Search .................. 350/334, 351, 339 F, 350/350 F

[56] References Cited

U.S. PATENT DOCUMENTS

| | | | |
|---|---|---|---|
| 3,322,485 | 5/1967 | Williams | 350/331 R |
| 3,600,060 | 8/1971 | Churchill et al. | 350/351 X |
| 3,720,623 | 3/1973 | Cartmell et al. | 350/350 R X |
| 3,797,914 | 3/1974 | Aiken | 350/338 |
| 3,840,695 | 10/1974 | Fischer | 350/345 X |
| 3,844,637 | 10/1974 | Masi | 350/345 |
| 3,864,022 | 2/1975 | Moriyama et al. | 350/349 |
| 3,910,681 | 10/1975 | Elliott et al. | 350/345 X |
| 4,021,945 | 5/1977 | Sussman | 350/345 X |
| 4,048,358 | 9/1977 | Shanks | 350/351 X |
| 4,279,152 | 7/1981 | Crossland | 350/351 X |
| 4,411,495 | 10/1983 | Beni et al. | 350/347 |
| 4,435,047 | 3/1984 | Fergason | 350/349 X |
| 4,470,666 | 9/1984 | Eick | 350/339 F |
| 4,596,445 | 6/1986 | Fergason | 350/339 F |
| 4,606,611 | 8/1986 | Fergason | 350/334 |
| 4,616,903 | 10/1986 | Fergason | 350/334 |
| 4,662,720 | 5/1987 | Fergason | 350/339 F |

FOREIGN PATENT DOCUMENTS

| | | |
|---|---|---|
| 2139537 | of 0000 | France . |
| 5218196 | of 0000 | Japan . |
| 5559431 | of 0000 | Japan . |
| 54-11698 | 1/1979 | Japan .............................. 350/339 F |
| 57-192928 | 11/1982 | Japan . |
| 0186737 | 11/1982 | Japan .............................. 350/339 F |

OTHER PUBLICATIONS

White et al., New Absorptive Mode Reflective Liquid-Crystal Display Device, American Institute of Physics, V. 15, No. 11, Nov. 1974, pp. 4718-4723.
Urisu et al., Liquid Crystal Display Device for Total Reflection Switching with Fluorescent Dye Addition, Applied Optics, vol. 20, No. 4, Feb. 1981, pp. 633-635.
Sato et al., Multicolor Fluorescent Liquid-Crystal Display Concepts, Applied Physics Letters, Oct. 1980, pp. 677-679.
Craighead et al., "New Display Based on Electrically Induced Index Matching in an Inhomogeneous Medium", *Appl. Phys. Lett.*, vol. 40, No. 1 (1 Jan. 1982), pp. 22-24.

(List continued on next page.)

*Primary Examiner*—John S. Heyman
*Assistant Examiner*—Richard Gallivan
*Attorney, Agent, or Firm*—Renner, Otto, Boisselle & Sklar

[57] ABSTRACT

A liquid crystal material contained in plural volumes in a containment medium and operative selectively to transmit light in the presence of a prescribed input or to scatter light, and non-pleochroic dye in at least one of the liquid crystal material and the containment medium. In one embodiment generally isotropic scattering of light by the liquid crystal together with enhanced scattering features which increase the path length of the light through dye results in increased coloration with minimum dye. The enchanced scattering features may be achieved using total internal reflection and/or optical interference principles. In an embodiment the dye is a fluorescent dye.

7 Claims, 4 Drawing Sheets

OTHER PUBLICATIONS

Wysocki et al., "Electric-Field-Induced Phase Change in Cholesteric Liquid Crystal", *Physical Review Letters*, vol. 20, No. 19 (6 May 1968), pp. 1024–1025.

Heilmeier et al., "Dynamic Scattering in Nematic Liquid Crystals", *Applied Physics Letters*, vol. 13, No. 1 (1 Jul. 1968), pp. 46–47.

Frederic J. Kahn, "Ir-Laser-Addressed Thermo-Optic Smectic Liquid-Crystal Storage Displays", *Appl. Phys. Lett.*, vol. 22, No. 3, (1 Feb. 1973), pp. 111–113.

Beni et al., "Electro-Wetting Displays", *Appl. Phys. Lett.*, vol. 38, No. 4 (15 Feb. 1981), pp. 207–209.

Cheng et al., "Boundary-Layer Model of Field Effects in a Bistable Liquid-Crystal Geometry", *J. Appl. Phys.*, vol. 52, No. 4 (Apr. 1981), pp. 2756–2765.

Cheng et al., "The Propagation of Disclinations in Bistable Switching", *J. Apply. Phys.*, vol. 52, No. 4 (Apr. 1981), pp. 2766–2775.

Beni et al., "Anisotropic Suspension Display", *Apply. Phys. Lett.*, vol. 39, No. 3 (1 Aug. 1981), pp. 195–197.

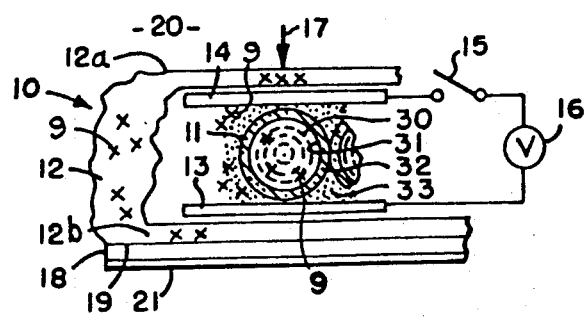
FIG. 1
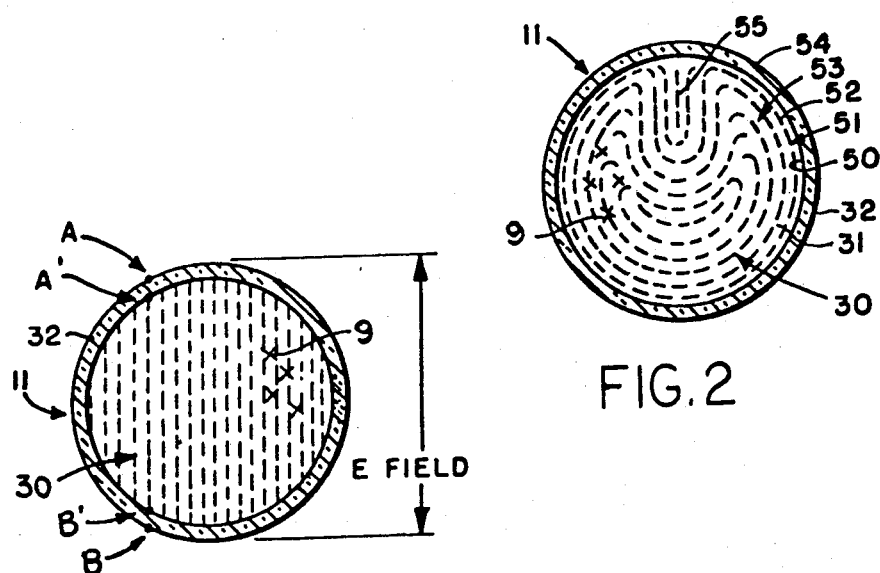
FIG. 2
FIG. 3
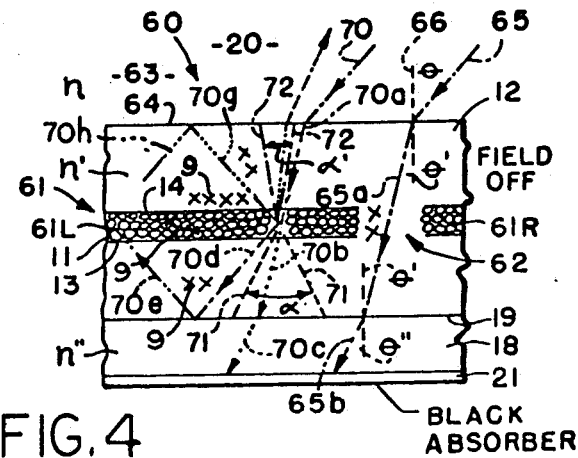
FIG. 4

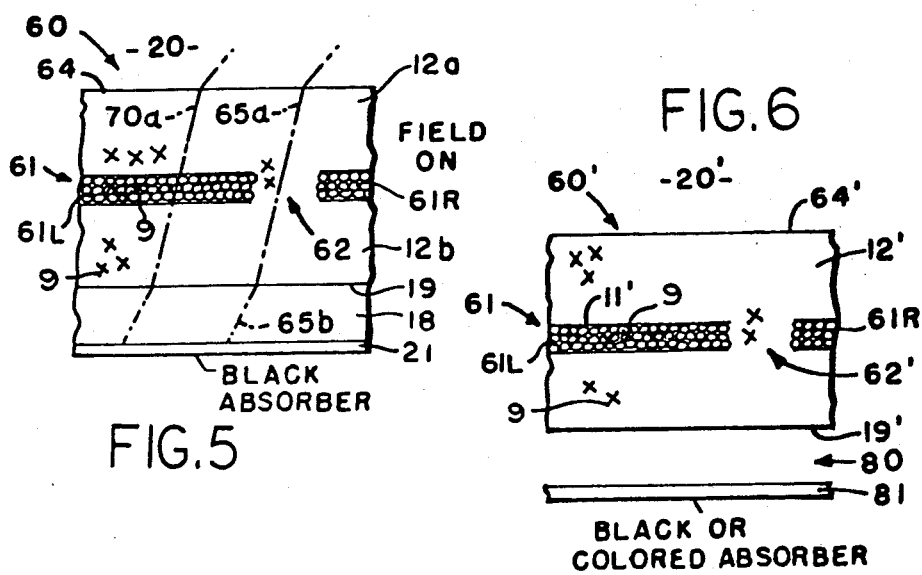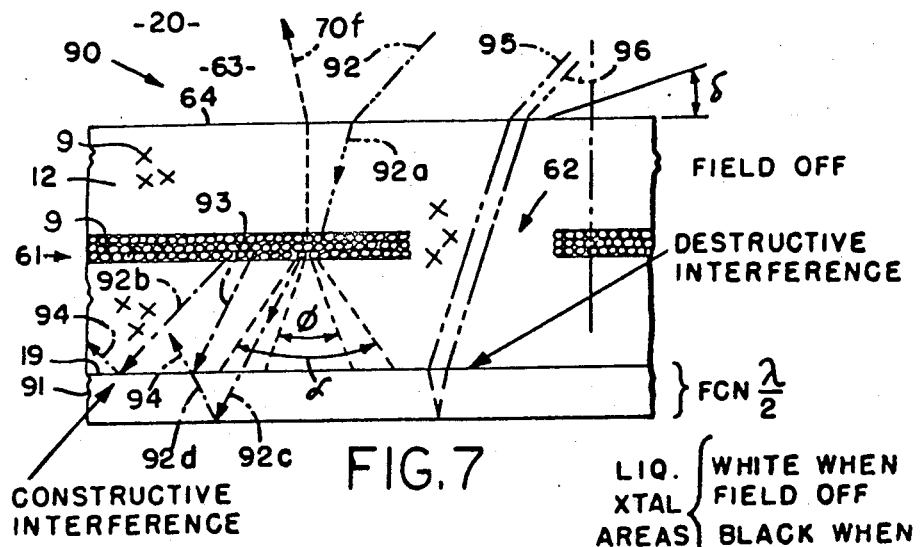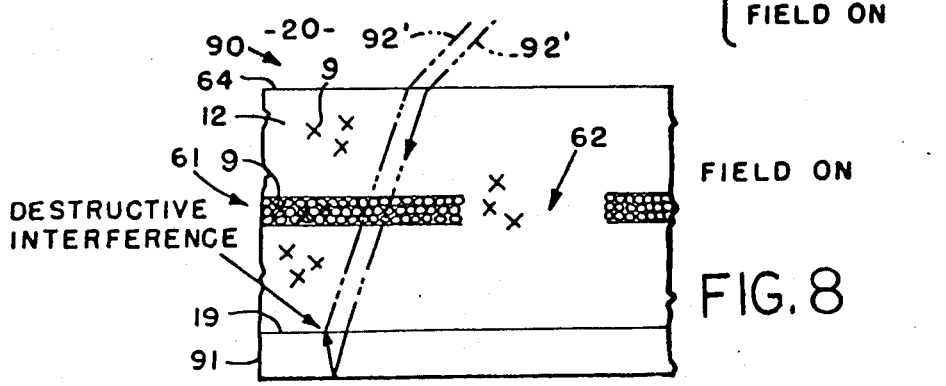

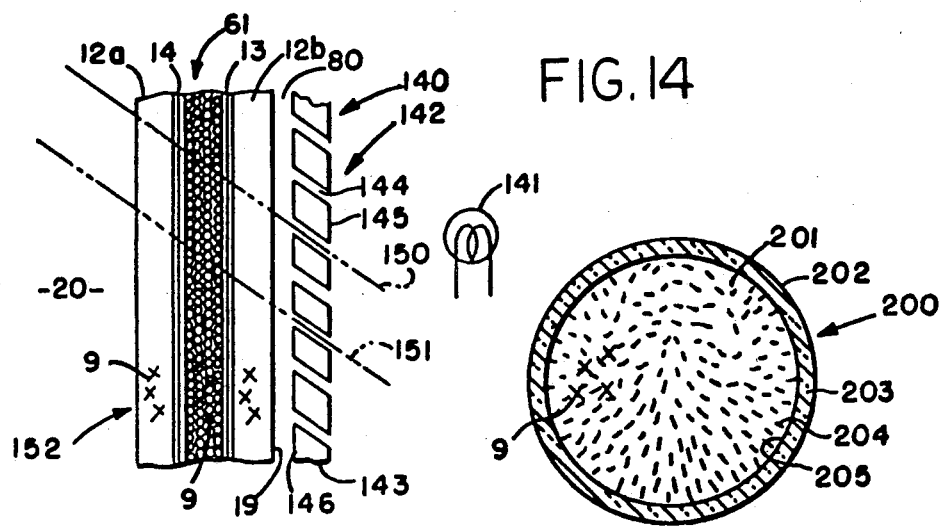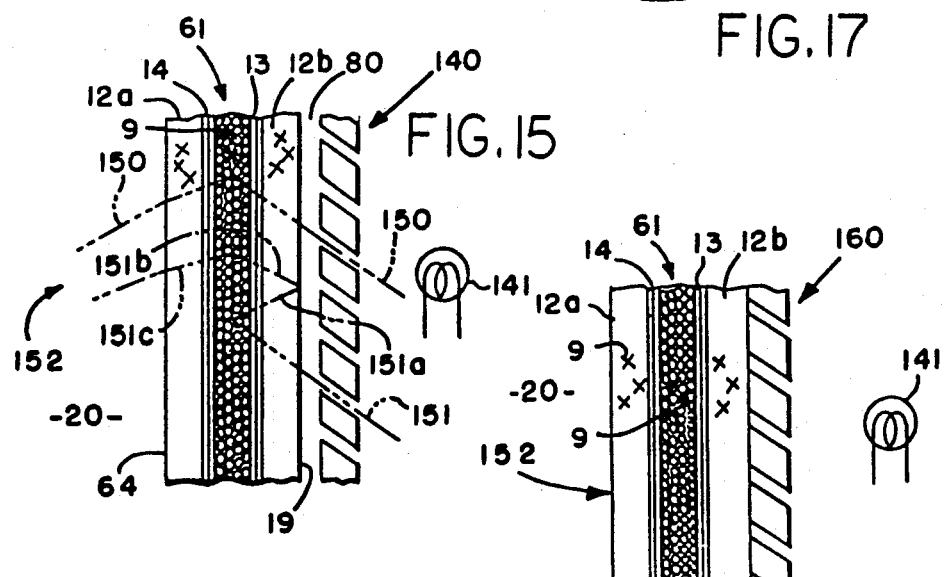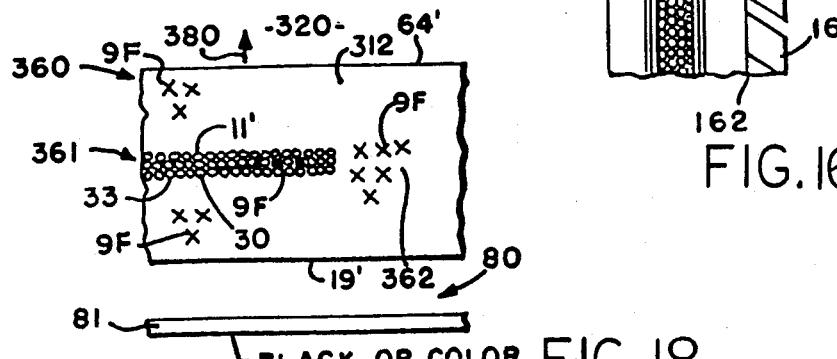

COLORED ENCAPSULATED LIQUID CRYSTAL APPARATUS USING ENHANCED SCATTERING, FLUORESCENT DYE AND DIELECTRIC THIN FILMS

This is a division of applicant's copending application Ser. No. 480,466, filed on Mar. 30, 1983, now U.S. Pat. No. 4,596,445, issued on June 24, 1986.

CROSS REFERENCE TO RELATED APPLICATION

Reference is made to applicant's copending, commonly assigned U.S. patent application Ser. No. 302,780, filed Sept. 16, 1981, for "Encapsulated Liquid Crystal and Method", now U.S. Pat. No. 4,435,047; U.S. patent application Ser. No. 477,242, filed Mar. 21, 1983, for "Encapsulated Liquid Crystal and Method", now U.S. Pat. No. 4,616,903; U.S. patent application Ser. No. 477,138, filed Mar. 21, 1983, for "Enhanced Scattering in Voltage Sensitive Encapsulated Liquid Crystal"; and U.S. patent application Ser. No. 480,461, concurrently filed herewith, for "Colored Encapsulated Liquid Crystal Devices Using Imbibition Of Colored Dyes And Scanned Multicolor Displays" now U.S. Pat. No. 4,662,720. The entire disclosures of such applications are hereby incorporated by reference.

TECHNICAL FIELD

The present invention relates generally to the art of liquid crystals, to the producing of a color output of a liquid crystal device, and, more particularly, to the scattering of light by liquid crystal material and reflection of the scattered light to increase the optical path length in the liquid crystal apparatus to enable coloring of the light using non-pleochroic dye. Moreover, the invention relates to using encapsulated liquid crystal or liquid crystal material held in a containment medium, such as an emulsion, with dye in the containment medium, and/or in the support medium therefor. The invention also relates to use of non-pleochroic dye in the liquid crystal material. Additionally, the invention relates to use of a fluorescent dye in a liquid crystal device. The invention further relates to methods of making and using such liquid crystal apparatus.

BACKGROUND

Liquid crystal material currently is used in a wide variety of devices, including, for example, optical devices such as visual displays. A property of liquid crystals enabling use in visual displays is the ability to scatter and/or to absorb light when the liquid crystals are in a random alignment and the ability to transmit light when the liquid crystals are in a ordered alignment.

Frequently a visual display using liquid crystals displays dark characters on a gray or relatively light background. In various circumstances it would be desirable, though, using liquid crystal material to be able to display with facility relatively bright colored characters or other information, etc. on a relatively dark background. It would be desirable as well to improve the effective contrast between the character displayed and the background of the display itself.

An example of electrically responsive liquid crystal material and use thereof is found in U.S. Pat. No. 3,322,485. Certain types of liquid crystal material are responsive to temperature, changing the optical characteristics, such as the random or ordered alignment of the liquid crystal material, in response to temperature of the liquid crystal material.

Currently there are three categories of liquid crystal materials, namely cholesteric, nematic and smectic. The present invention preferably uses nematic liquid crystal material or a combination of nematic and some cholesteric type. More specifically, the liquid crystal material preferably is operationally nematic, i.e. it acts as nematic material and not as the other types. Operationally nematic means that in the absence of external fields structural distortion of the liquid crystal is dominated by the orientation of the liquid crystal at its boundaries rather than bulk effects, such as very strong twists as in cholesteric material, or layering as in smectic material. Thus, for example, chiral ingredients which induce a tendency to twist but cannot overcome the effects of boundary alignment still would be operationally nematic. Such material should have a positive dielectric anisotropy. Although various characteristics of the various liquid crystal materials are described in the prior art, one known characteristic is that of reversibility. Particularly, nematic liquid crystal material is known to be reversible, but cholesteric material ordinarily is not reversible.

It is also known to add pleochroic dyes to the liquid crystal material, for example, for increasing absorption characteristics. However, in the nematic form a pleochroic device has relatively low contrast. In the past cholesteric material would be added to the nematic material together with the dye to improve contrast ratio. See for example the White et al article in *Journal of Applied Physics*, Vol. 45, No. 11, November 1974, at pages 4718–4723. However, although nematic material is reversible, depending on whether or not an electric field is applied across the same, cholesteric material ordinarily would not tend to its original zero field form when the electric field would be removed. Another disadvantage to use of pleochroic dye in solution with liquid crystal material is that the absorption of the dye is not zero in the field-on condition; rather, absorption in the field-on condition follows an ordering parameter, which relates to or is a function of the relative alignment of the dyes. Moreover, pleochroic dyes are relatively expensive and must be used carefully, usually having to be mixed directly in the liquid crystal material itself.

Usually liquid crystal material is anisotropic both optically (birefringence) and, for example in the case of nematic material, electrically. The optical anisotropy is manifest by the scattering and/or absorption (especially when pleochroic dye is in solution with the liquid crystal material) of light when the liquid crystal material is in random alignment, and the transmission of light through the liquid crystal material when it is in ordered alignment. The electrical anisotropy may be a relationship between the dielectric constant or dielectric coefficient with respect to the alignment of the liquid crystal material.

In the past, devices using liquid crystals, such as visual display devices, have been relatively small. Use of encapsulated liquid crystals disclosed in applicant's above mentioned co-pending applications has enabled the satisfactory use of liquid crystals in relatively large size displays, such as billboards, etc., as is disclosed in such application; and another large (or small) scale use may be as an optical shutter to control passage of light from one area into another, say at a window or window-like area of a building. The present invention relates to improvements in such encapsulated liquid crystals and to the utilization of the light scattering characteristic of the liquid crystal material and reflection, e.g. by total internal reflection and/or optical constructive interference, of the scattered light to increase optical path length in a material containing a relatively small quantity of preferably standard or other non-pleochroic dye. The increased path length through the dye assures the desired coloring of output light. The invention also relates to the use of such material and characteristics, for example, to obtain a relatively bright colored character or information displayed on a relatively dark or colored background in both small and large displays, optical shutters, and so on. Such large displays, shutters, etc. may be about one square foot surface area or even larger. In accordance with the present invention the liquid crystal material most preferably is of the encapsulated type.

As used herein with respect to the present invention, encapsulated liquid crystal material means liquid crystal material in a substantially closed containment medium, such as discrete capsules or cells, and preferably may be in the form of an emulsion of the liquid crystal material and the containment medium. Such emulsion should be a stable one. Various methods for making and using encapsulated liquid crystal material and apparatus associated therewith are disclosed below and in applicant's copending applications, which are incorporated by reference.

To facilitate comprehension of the invention relative to conventional prior art liquid crystal displays, one typical prior art display is described here. Such a prior display may include a support medium and liquid crystal material supported thereby. The display is relatively flat and is viewed from a viewing side or direction from which a so-called front or top surface of the display is viewed. The back or bottom surface of the support medium may have a light reflective coating tending to make the same appear relatively bright incomparison to relatively dark characters formed at areas where there is liquid crystal material. (Back, front, top, bottom, etc. are used herein in general and with reference to the drawings only for convenience; there is no constraint that in operation the viewing direction must be, for example, from only the top, etc.). When the liquid crystal material is in ordered alignment, for example in reponse to application of an electric field thereto, incident light from the viewing direction passes through the liquid crystal material to the light reflective coating and also where there is no liquid crystal material passes directly to the light reflective coating; and no character is observed from the viewing direction. However, when the liquid crystal material is in random alignment, it will absorb some and scatter some incident light thereby to form a relatively dark character on a relatively light color background, for example of gray or other color depending on the type of light reflective coating mentioned above, which still continues to reflect incident light where there is no liquid crystal material or where some liquid crystal material is in ordered alignment. In this type of display it is undesirable for the liquid crystal material to scatter light because some of that scattered light will be directed back in the viewing direction thereby reducing the darkness or contrast of the character relative to the background of the display. Pleochroic dye often is added to the liquid crystal material to increase absorbence and, thus, contrast when the liquid crystal material is in random alignment.

BRIEF SUMMARY OF THE INVENTION

Succinctly stated, the disclosure relates to the producing of a colored output by a liquid crystal device which uses non-pleochroic dye, and to isotropic scattering and reflecting of isotropically scattered light in the device to increase the path length through the dye to yield a relatively bright colored appearance, character, information, etc., especially relative to background, when a liquid crystal material is in a field-off or distorted alignment condition and a different colored or dark appearance, e.g. the same as background, when the liquid crystal materials is in field-on parallel or ordered alignment condition. Preferably the liquid crystal material is nearly completely isotropically scattering when in distorted alignment. Isotropic scattering means that when a beam of light enters the liquid crystal material here is virtually no way to predict the exit angle of scattered light.

Importantly, the dye is in the containment medium, in the support medium, or in the liquid crystal material and need not be of the specialized pleochroic type. The dye should be soluble, and, thus, dissolved, in the medium containing same. For example, a water soluble dye may be dissolved in a water base polyvinyl alcohol containment medium, and/or an oil soluble dye may be dissolved in an oil liquid crystal material.

Coloring of the visual or optical output is due to the increased path length of the isotropically scattered light in the support medium due to the reflection, preferably totally internal reflection, therein. Some light not totally internally reflected in the support medium will exit a viewing surface thereof to effect the colored character display or output.

An advantage of applying the dye to the support medium and not to the liquid crystal is that a universal base stock of encapsulated liquid crystal may be manufactured, stored and used, when needed, in conjunction with a dyed support medium of any color to achieve the desired color display.

An advantage to use of fluorescent dye is the effective or apparent light amplification due to light emitted by the flourescent dye in response to incident light or possibly other radiation.

As is used herein with respect to the invention, the terms distorted alignment, random alignment and field-off condition mean essentially the same thing; namely, that the directional orientation of the liquid crystal molecules is distorted to an effectively curved configuration. Such distortion is effected, for example, by the wall of respective capsules. The particular distorted alignment of liquid crystal material in a given capsule usually always will be substantially the same in the absence of an electric field.

On the other hand, as it is used herein with respect to the invention, parallel aligned, ordered alignment, and field-on condition means that the liquid crystal material in a capsule is generally aligned with respect to an externally applied electric field.

In accordance with one aspect of the present invention, a liquid crystal display can produce relatively bright colored characters, information, etc., on a relatively dark background; the bright colored character is produced by liquid crystal material that is randomly aligned. The multiple passes of light through the dyed material, which is not of the pleochroic type, satisfactorily colors the light output by the display, optical shutter, etc. The background is caused, for example, by liquid crystal material that is in ordered alignment and, thus, substantially optically transparent and/or by areas of the display where there is no liquid crystal material. When the liquid crystal material is in parallel or ordered alignment, only the relatively dark background, e.g., formed by an absorber, would appear. The foregoing is accomplished using relatively low power requirements, minimum liquid crystal material, and illumination either from the viewing side or direction or from the back or non-viewing side of the display. The principles of the invention also may be used in an optical shutter or light control device to control brightness, for example.

Briefly, the liquid crystal apparatus includes liquid crystal material for selectively primarily scattering or transmitting light in response to a prescribed input and a support medium for holding therein or supporting thereon the liquid crystal material. In accordance with a preferred embodiment and best mode of the invention, the liquid crystal material is of the encapsulated type, e.g., liquid crystal material in a containment medium, and such encapsulated liquid crystal is positioned in or mounted on a support medium. Alternatively, the containment medium itself may form or be part of the support medium. Such encapsulated liquid crystal material will cause substantially isotropic scattering of light incident thereon, including the scattering of some of such light back in the viewing direction toward, for example, the eye of an observer. More preferably, such liquid crystal is operationally nematic, has a positive dielectric anisotropy, and has an ordinary index of refraction that substantially matches that of the containment or encapsulating medium therefor.

In one embodiment, a large quantity of light that is isotropically scattered by the liquid crystal material is totally internally reflected by the support medium back to the liquid crystal material thereby illuminating the same and causing further isotropic scattering and brightening of the appearance of the liquid crystal material, for example to the eye of an observer. The extensive path length of light in the support medium, containment medium, and/or liquid crystal material itself and the dye carried by one or more thereof assures the desired coloring of the light to give a colored output appearance when the structure of the liquid crystal is in a random or distorted alignment in the absence of an electric field. The internal reflectance characteristic of the support medium may be effected by the interface of such back surface with another medium, such as a solid, liquid, or gas, even including air, with the constraint that the index of refraction of the support medium is greater than the index of refraction of such other medium. The support medium may be comprised of several components, including, for example, the containment/encapsulating material (or that with which the liquid crystal material is in emulsion), additional quantities of such encapsulating or other material, a mounting medium, such as a plastic-like film or glass, etc., all of which will be described in further detail below.

The back surface of the support medium may be optically transmissive so that light that reaches such surface in a direction substantially normal thereto will be transmitted. A light absorbing black or colored material beyond such back surface can help darken or color the apparent background on which the characters formed by liquid crystal material appear. Ordered alignment of the liquid crystal material will at least substantially eliminate the isotropic scattering so that substantially all the light passing through the liquid crystal material will also pass through the back surface of the support medium.

In an alternate embodiment, a tuned dielectric coating may be applied, e.g. by evaporation techniques, to the back surface of the support medium to effect selective constructive and destructive optical interference. The thickness of such tuned dielectric coating will be a function of lambda ($\lambda$) divided by 2, lambda being the wavelength of light employed with the apparatus. Constructive interference will enhance the internal reflection, especially by reducing the solid angle within which light would not be totally internally reflected in the support medium; and, therefore, such interference will further brighten and intensify the color of the appearance of the liquid crystal material characters.

Incident illumination for a liquid crystal display embodying the invention may be from the front or viewing side. Alternatively, incident illumination may be from the back side, preferably through a mask or director to direct light fully transmitted by the liquid crystal material out of the field or angle or view at the viewing side. However, light scattered by the liquid crystal material within the viewing angle woud be seen.

Moreover, a cholosteric material may be added to the nematic liquid crystal material to expedite return of the latter to distorted alignment pattern following in general the configuration of the capsule or cell wall when the electic field is turned off, especially when the capsules are relatively large. Also, if desired, a viscosity controlling additive may be mixed with the liquid crystal. Further, an additive to the liquid crystal may be used to help force a preferred alignment of the liquid crystal structure in a capsule.

These and other embodiments of the invention will become apparent as the following description proceeds.

A primary object of the present invention is to provide improvement in liquid crystal apparatus to provide colored output.

Another primary object is to effect selective substantially isotropic scattering of light using liquid crystal material, especially of the operationally nematic type, to reflect such scattered light, and to color such light, especially using non-pleochroic dye.

Still another primary object is to provide the various features and objects of the invention in large size displays, in relatively small size displays and in optical shutters or other light control devices.

Even another primary object is to use non-pleochroic dye in a liquid crystal optical apparatus, especially with such dye being in the containment medium for encapsulating liquid crystal material, in such liquid crystal material itself, and/or in a support medium for the encapsulated liquid crystal material.

Another object is to enhance the colored optical output of liquid crystal apparatus.

An additional object is to display bright colored characters, information or the like on a relatively dark background using liquid crystal apparatus.

A further object is to use the principle of total internal reflection to enhance operation of liquid crystal apparatus, particularly a liquid crystal display, and especially to enhance the use of isotropically scattered light cooperating to increase the path length of light in the liquid crystal device and through non-pleochroic dye contained therein.

Even another object is to use the principles of optical interference to enhance the optical output of a liquid crystal apparatus, particularly a liquid crystal display.

Even an additional object is to scatter light isotropically in a liquid crystal apparatus and to use such isotropically scattered light to create a bright colored character on a relatively dark background.

Even a further object is to improve the contrast of a liquid crystal apparatus.

Still another object is to improve the versatility of liquid crystal optical devices.

Still an additional object is to provide a method for making a liquid crystal apparatus.

Still a further object is to use colored liquid crystal apparatus in small and large scale devices, especially employing encapsulated liquid crystal material.

Yet another object is to provide incident illumination for a liquid crystal device from the non-viewing side thereof, and especially to provide bright colored characters, information, or transmitted light relative to background when using such illumination.

Yet an additional object is to facilitate and/or to expedite the return of encapsulated operationally nematical liquid crystal material to a field-off random or distorted alignment.

Yet a further object is to minimize the amount of liquid crystal material required for a particular function, optical device, etc.

Even another object is to help force the liquid crystal structure in a capsule to a preferred orientation therein when in a field-off condition.

Even an additional object is to amplify light isotropically scattered in a liquid crystal apparatus using a fluorescent dye.

Even a further object is to use a fluorescent dye in a liquid crystal device.

These and other objects and advantages of the present invention will become more apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF DRAWINGS

In the annexed drawings:

FIG. 1 is a schematic representation of a liquid crystal device in accordance with the present invention;

FIGS. 2 and 3 are enlarged schematic illustrations of a liquid crystal capsule in accordance with the present invention respectively under a no-field or field-off condition and under an applied electric field or fieldon condition;

FIGS. 4 and 5 are schematic representations of a liquid crystal apparatus according to one embodiment of the invention, respectively in a no-field condition and in an applied electric field condition;

FIG. 6 is a schematic representation of another embodiment of a liquid crystal apparatus in accordance with the present invention using an air gap to cause total internal reflection;

FIGS. 7 and 8 are schematic representations of another embodiment of liquid crystal apparatus in accordance with the present invention employing optical interference principles respectively under a no-field condition and under an applied electric field condition;

FIGS. 14 and 15 are schematic illustrations of still another embodiment of liquid crystal apparatus with a light control film director provided with incident illumination from the non-viewing side, respectively, in the field on and field off conditions;

FIG. 16 is a schematic illustration similar to FIGS. 14 and 15 but with the light control film director cemented to the support medium;

FIG. 17 is a schematic illustration like FIGS. 2 and 3 showing an alternate embodiment of encapsulated liquid crystal; and FIG. 18 is a view like FIG. 6 but showing an embodiment using fluorescent dye.

DESCRIPTION OF THE PREFERRED EMBODIMENTS

Figure 9:
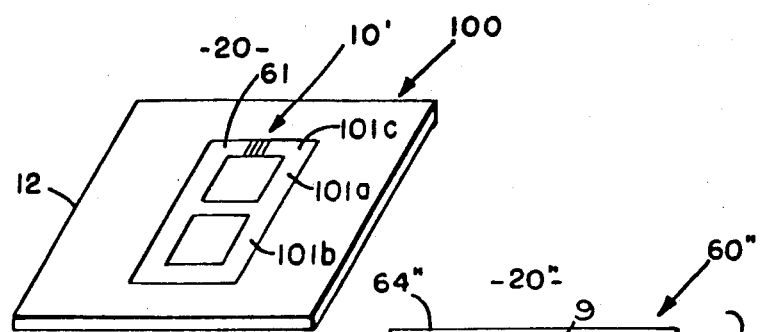
FIG. 9 is an isometric view of a liquid crystal display apparatus in accordance with the present invention and which may be formed of any of the embodiments disclosed herein.

Referring in detail to the drawings, wherein like reference numerals designate like parts in the several figures, and initially to FIGS. 1, 2 and 3, encapsulated liquid crystal material used in accordance with the present invention is illustrated. In FIG. 1 is a schematic representation showing non-pleochroic dye 9 in a liquid crystal apparatus 10 in accordance with the present invention. Throughout the drawings such dye is represented by "X"-like marks; for clarity only several of such marks are shown, but it will be appreciated that such dye preferably is generally uniformly or otherwise in a known or specified way distributed in the respective medium or material in which it is contained.

The apparatus 10 includes encapsulated liquid crystal material 11 represented by a single capsule in FIGS. 1-3. Although the capsules illustrated in the drawings are shown in two dimensions and, therefore, planar form, it will be appreciated that the capsules are three dimensional, most preferably spherical. The capsule 11 is shown mounted in a preferably generally transparent support medium 12 having upper and lower portions 12a, 12b which may be integral with each other. The apparatus 10 also includes a pair of electrodes 13, 14 for applying an electric field across the liquid crystal material when a switch 15 is closed to energize the electrodes from a conventional voltage source 16.

The dye 9 may be in one or more of the support medium 12, and, preferably, the containment medium 33 (described further below). It also may be in the liquid crystal material 30. Moreover, it is preferable that the dye be soluble in the material or medium containing same, especially to avoid the problem of the dye precipitating out of the material or medium and preferably to achieve the desired uniformity or controlled distribution of the dye.

A primary feature of the present invention is that such encapsulated liquid crystal material will isotropically scatter light impinging thereon when in a field-off random alignment condition; and in the field-on orderly aligned condition, such material will be substantially optically transparent.

It is to be understood that the capsule 11 may be one of many capsules that are discretely formed or, more preferably, that are formed by mixing the liquid crystal material with a so-called encapsulating material or containment medium to form an emulsion, preferably a stable one. The emulsion may be applied to or sandwiched between the support media portions 12a, 12b, and electrodes 13, 14, as is illustrated. If desired, the support medium 12 and the so-called encapsulating material or containment medium may be the same material. As a further alternative, the upper and lower support medium portions 12a, 12b, or one of them, may be a plastic-like, glass, or like, preferably transparent, mounting material. As used herein, transparent still allows the possibility of dye being contained in the transparent material. The electrodes 13,14 may be applied to such mounting material and the encapsulated liquid crystal material/emulsion, including many capsules 11, for example, may be sandwiched between such mounting material 12a, 12b to form the apparatus 10, as will be described in further detail below.

A reflectance medium 18 forms an interface 19 with the lower support medium portion 12b to obtain the desired total internal reflection function, which will be described in greater detail below. Suffice it to say here, though, that due to the total internal reflection principle of operation, the liquid crystal material in the capsule 11 will be illuminated by incident light, for example represented by a light beam 17, and with light that it isotropically scatters in the apparatus 10 so that from the viewing area 20 beyond the upper support medium portion 12a, the liquid crystal material 11 will appear colored and relatively bright when under a no-field condition, e.g. the switch 15 is open. Although such isotropic scattering (and some absorption, especially with a pleochroic dye present in the encapsulated liquid crystal material) occurs in applicant's invention disclosed in the above co-pending application Ser. No. 302,789, the total internal reflection principle of the present invention enhances scattering and coloring of the reflected/scattered light by the non-pleochroic dye and, thus, brightens the visual/optical colored appearance of characters, etc., formed or output by the encapsulated liquid crystal material. A light absorbing layer 21 of black or colored material may be applied to the bottom or back surface of the reflectance medium 18 remote from the interface 19 to absorb light incident on the layer 21.

The electrode 13 may be, for example, a quantity of vacuum deposited indium tin oxide applied to the lower support medium portion 12b, and the electrode 14 may be, for example, electrically conductive ink applied directly to the liquid crystal material or could be like the electrode 13. Other electrode material and mounting means therefor also may be used for either electrode. Examples include tin oxide and antimony doped tin oxide. Preferably the electrodes are relatively thin, for example, about 200 angstroms thick, and transparent so that they do not significantly affect the optics of the liquid crystal apparatus 10.

The encapsulated liquid crystal material 11 includes liquid crystal 30 contained within the confines or interior volume 31 of a capsule 32. Each capsule 32 may be a discrete one or alternatively the liquid crystal 30 may be contained in a stable emulsion of a containment medium or so-called encapsulating material 33 that tends to form a multitude of capsule-like environments for containing the liquid crystal material. For convenience of illustration, the capsules 32 are shown as discrete capsules in and preferably formed of the overall quantity of containment medium or encapsulating material 33. According to the preferred embodiment and best mode of the present invention, the capsule 32 is generally spherical, and the liquid crystal 30 is nematic or operationally nematic liquid crystal material having positive dielectric anisotropy. However, the principles of the invention would apply when the capsule 32 is of a shape other than spherical; such shape should provide the desired optical and electrical characteristics that will satisfactorily coact with the optical characteristics of the liquid crystal material 30, e.g. index of refraction, and will permit an adequate portion of the electric field to occur across the liquid crystal 30 itself for effecting desired ordered or parallel alignment of the liquid crystal when it is desired to have a field-on condition. The shape also should tend to distort the liquid crystal material when in a field-off or random alignment condition. A particular advantage to the preferred spherical configuration of the capsule 32 is the distortion it effects on the liquid crystal 30 therein when in a field-off condition. This distortion is due, at least in part, to the relative sizes of the capsules and the pitch of the liquid crystal; they preferably are about the same or at least about the same order of magnitude. Moreover, nematic liquid crystal material has fluid-like properties that facilitate the conformance or the distortion thereof to the shape of the capsule wall in the absence of an electric field. On the other hand, in the presence of an electric field such nematic material will relatively easily change to ordered alignment with respect to such field.

Liquid crystal material of a type other than nematic or combinations of various types of liquid crystal material and/or other additives may be used with or substituted for the preferred nematic liquid crystal material as long as the ecapsulated liquid crystal is operationally nematic. However, cholesteric and smectic liquid crystal material generally are bulk driven. It is more difficult to break up the bulk structure thereof for conformance to capsule wall shape and energy considerations in the capsule.

Dye 9 may be directly in the containment medium 33 itself. The quantity of dye may be as small as about 0.01% to about 1% by weight of the containment medium 33 and preferably from about 0.1% to about 0.5%. Preferably the containment medium is water base and the dye is water soluble. Therefore, the dye will dissolve therein and will not migrate to the liquid crystal. However, due to the long path length of most of the light in the containment medium, such small quantity of dye will have an effective light coloring result. Moreover, it has been discovered that the light coloring of the present invention results in the appearance of pigmented colors, such as pigmented green, e.g. like green paint; this is in distinction to the relatively poor quality of green light, for example, obtained using a green dyed filter. Similar experiences occur for other colors, too.

Examplary non-pleochroic dyes include water soluble dyes, food coloring dyes, and cloth or fabric dyes.

Particularly examples include FD&C Blue #2 indigo carmine, FD&C Red #2 amaranth, FD&C Red #3 erythosine, FD&C Yellow #5 tartazine, as well as, from American Color Corp., Direct Orange 72, Direct Red 80, Direct Red 81, Direct Blue I, Direct Yellow #4GL, and Direct Yellow #6.

Alternatively, the dye 9 may be an oil soluble dye which dissolves in the oil base liquid crystal material and does not migrate to the containment medium. Examples of such dyes include: FD&C Yellow #2, Naphthol Yellow S.

Turning to FIGS. 2 and 3, a schematic representation of the single capsule 32 containing liquid crystal 30 is shown, respectively, in the field-off and field-on conditions. The capsules 32 are spherical and have a generally smooth curved interior wall surface 50 defining the boundary for the volume 31. The actual dimensional parameters of the wall surface 50 and of the overall capsule 32 are related to the quantity of liquid crystal 30 contained therein and possibly to other characteristics of the individual liquid crystal material therein. Additionally, the capsule 32 applies a force to the liquid crystals 30 tending to pressurize or at least to maintain substantially constant the pressure within the volume 31. As a result of the foregoing, and due to the surface wetting nature of the liquid crystal, the liquid crystals which ordinarily in free form would tend to be parallel, although perhaps randomly distributed, are distorted to curve in a direction that generally is parallel to a relatively proximate portion of the interior wall surface 50. Due to such distortion the liquid crystals store elastic energy. For simplicity of illustration, a layer 51 of liquid crystal molecules whose directional orientation is represented by respective dashed lines 52 is shown in closest proximity to the interior wall surface 50. The directional orientation of the liquid crystal molecules 52 is distorted to curve in the direction that is parallel to a proximate area of the wall surface 50. The directional pattern of the liquid crystal molecules away from the boundary layer 52 within the capsule is represented by 53. The liquid crystal molecules are directionally represented in layers, but it will be appreciated that the molecules themselves are not confined to such layers. Thus, the organization in an individual capsule is predetermined by the organization of the structure 52 at the wall and is fixed unless acted on by outside forces, e.g. an electric field. On removal of the electric field the directional orientation would revert back to the original one, such as that shown in FIG. 2.

Nematic type material usually assumes a parallel configuration and usually is optical polarization direction sensitive. However, since the material 52 in the encapsulated liquid crystal 11 is distorted or forced to curved form in the full three dimensions of the capsule 32, such nematic liquid crystal material in such capsule takes on an improved characteristic of being insensitive to the direction of optical polarization of incident light.

The liquid crystal 30 in the capsule 32 has a discontinuity 55 in the generally spherical orientation thereof due to the inability of the liquid crystal to align uniformly in a manner compatible with parallel alignment with the wall 50 and a requirement for minimum elastic energy. Such discontinuity is in three dimensions and is useful to effect a distorting of the liquid crystal 30 further to decrease the possibility that the liquid crystal 30 would be sensitive to optical polarization direction of incident light. The discontinuity protrusion 55 would tend to cause scattering and absorption within the capsule, and the tangential or parallel alignment of the liquid crystal molecules with respect to portions of the interior wall surface 50 of the capsules both cause scattering and absorption within the capsule 32. When the electric field is applied, for example, as is shown in FIG. 3, the discontinuity will no longer exist so that such discontinuity will have a minimum effect on optical transmission when the encapsulated liquid crystal 11 is in a field-on or aligned condition.

Although the foregoing discussion has been in terms of a homogeneous orientation of the liquid crystal material (parallel to the capsule wall), such is not a requisite of the invention. All that is required is that the interaction between the wall and the liquid crystal produce an orientation in the liquid crystal near that wall that is generally uniform and piecewise continuous, so that the spatial average orientation of the liquid crystal material over the capsule volume is strongly curved and there is no substantial parallel direction of orientation of the liquid crystal structure in the absence of an electric field. It is this strongly curved orientation that results in the scattering and polarization insensitivity in the field-off condition, which is a feature of this invention.

In the field-on condition, or any other condition which results in the liquid crystal being in ordered or parallel alignment, as is shown in FIG. 3, the encapsulated liquid crystal 11 will transmit substantially all the light incident thereon and will tend not to be visible in the support medium 12. On the other hand, in the field-off condition when the liquid crystal is in distorted alignment, sometimes referred to herein as random alignment, for example as is shown in FIG. 2, some of the incident light will be absorbed, but also some of the incident light will tend to be scattered isotropically in the support medium 12. Using total internal reflection such isotropically scattered light can be redirected to the, for example dyed, encapsulated liquid crystal 11 thus brightening the same tending to cause it to appear colored and relatively bright to a viewer or viewing instrument.

The index of refraction of the encapsulating medium 32 and the ordinary index of refraction of the liquid crystal 30 should be matched as much as possible when in the field-on or liquid crystal orderly aligned condition to avoid optical distortion due to refraction of incident light passing therethrough. However, when the liquid crystal material is in distorted or random alignment, i.e. there is not field applied, there will be a difference in the indices of refraction at the boundary of the liquid crystal 30 and wall of capsule 32; the extraordinary index of refraction of the liquid crystal is greater than the index of refraction of the encapsulating medium. This causes refraction at that interface or boundary of the liquid crystal material and of the containment on encapsulating medium and, thus, further scattering. Light that is so further scattered will be internally reflected for further brightening in the liquid crystal appearance. Such occurrence of different indices of refraction is known as birefringence. Principles of birefringence are described in Optics by Sears and in *Crystals And The Polarizing Microscope* by Hartshorne and Stewart, the relevent disclosures of which are hereby incorporated by reference. Preferably the encapsulating or containment medium 32 and the support medium 12 have the same index of refraction to appear optically substantially as the same material, thus avoiding a further optical interface.

As long as the ordinary index of refraction of the liquid crystal material is closer to the index of refraction of the so-called encapsulating mediu, than is the extraordinary index of refraction, a change in scattering will result when going from field-on to field-off conditions, and viceversa. Maximum contrast results when the ordinary index of refraction matches the index of refraction of the medium. The closeness of the index matching will be dependent on the desired degree of contrast and transparency in the device, but the ordinary index of refraction of the crystal and the index of the medium will preferably differ by no more than 0.03, more preferably 0.01, especially 0.001. The tolerated difference will depend upon capsule size.

According to the preferred embodiment and best mode, desirably the electric field E shown on FIG. 3 is applied to the liquid crystal 30 in the capsule 32 for the most part rather than being dissipated or dropped substantially in the encapsulating material. There should not be a substantial voltage drop across or through the material of which the wall 54 of the capsule 32 is formed; rather, the voltage drop should occur across the liquid crystal 30 within the volume 31 of the capsule 32.

The electrical impedance of the encapsulating medium preferably should in effect be large enough relative to that of the liquid crystal in the encapsulated liquid crystal 11 that a short circuit will not occur exclusively through the wall 54, say from point A via only the wall to point B, bypassing the liquid crystal. Therefore, for example, the effective impedance to induced or displacement current flow through or via only the wall 54 from point A to point B should be greater than the impedance that would be encountered in a path from point A to point A' inside the interior wall surface 50, through the liquid crystal material 30 to point B' still within the volume 31, ultimately to point B again. This condition will assure that there will be a potential difference between point A and point B. Such potential difference would be large enough to produce an electric field across the liquid crystal material that will tend to align the same. It will be appreciated that due to geometrical considerations, namely the length through only the wall from point A to point B, for example, such condition still can be met even through the actual impedance of the wall material is lower than that of the liquid crystal material therein.

The dielectric constants (coefficients) of the material of which the encapsulating medium is formed and of which the liquid crystal is comprised, and the effective capacitance values of the capsule wall 54, particularly in a radial direction and of the liquid crystal across which the electric field E is imposed, all should be so related that the wall 54 of the capsule 32 does not substantially drop the magnitude of the applied electric field E. Ideally the capacitance dielectric constants (coefficients) of the entire layer 61 (FIG. 4) of encapsulated liquid crystal material should be substantially the same for the field-on condition.

The liquid crystal 30 will have a dielectric constant value that is anisotropic. It is preferable that the dielectric constant (coefficient) of the wall 54 be no lower than the dielectric constant (coefficient) of the anisotropic liquid crystal material 30 to help meet the above conditions for optimum operation. It is desirable to have a relatively high positive dielectric anisotropy in order to reduce the voltage requirements for the electric field E. The differential between the dielectric constant (coefficient) for the liquid crystal 30 when no electric field is applied, which should be rather small, and the dielectric constant (coefficient) for the liquid crystal when it is aligned upon application of an electric field, which should be relatively large, should be as large as possible. The dielectric constants (coefficients) relationships are discussed in the concurrently filed application, the entire disclosure of which is specifically incorporated by reference here. It should be noted, in particular, though, that the critical relationship of dielectric values and applied electric field should be such that the field applied across the liquid crystal material in the capsule(s) is adequate to cause alignment of the liquid crystal structure with respect to the field. The lower dielectric values of commonly used liquid crystals are, for example, from as low as about 3.5 to as high as about 8.

The capsules 32 may be of various sizes. The smaller the size, though, the higher the requirements will be for the electric field to effect alignment of the liquid crystal in the capsule. Preferably, though, the capsules should be of uniform size parameters so that the various characteristics, such as the optical and electrical characteristics, of an apparatus, such as a display, using the encapsulated liquid crystal will be substantially uniform. Moreover, the capsules 32 should be at least 1 micron in diameter so they appear as discrete capsules relative to an incident light beam; a smaller diameter would result in the light beam "seeing" the capsules as a continuous homogeneous layer and would not undergo the required isotropic scattering. Examples of capsule sizes, say from 1–30 microns diameter, and of liquid crystal material are in the above concurrently filed application and are hereby specifically incorporated by reference.

A preferred liquid crystal material in accordance with the best mode of the invention is that nematic material NM-8250, an ester sold by American Liquid Xtal Chemical Corp., Kent, Ohio, U.S.A. Other examples may be ester combinations, biphenyl and/or biphenyl combinations, and the like.

Several other types of liquid crystal material useful according to the invention include the following four examples, each being a recipe for the respective liquid crystal materials. The so-called 10% material has about 10% 4-cyano substituted materials; the 20% material has about 20% 4-cyano substituted materials, and so on.

| 10% Material | | |
|---|---:|---|
| Pentylphenylmethoxy Benzoate | 54 | grams |
| Pentylphenylpentyloxy Benzoate | 36 | grams |
| Cyanophenylpentyl Benzoate | 2.6 | grams |
| Cyanophenylheptyl Benzoate | 3.9 | grams |
| Cyanophenylpentyloxy Benzoate | 1.2 | grams |
| Cyanophenylheptyloxy Benzoate | 1.1 | grams |
| Cyanophenyloctyloxy Benzoate | 9.94 | grams |
| Cyanophenylmethoxy Benzoate | 0.35 | grams |
| 20% Material | | |
| Pentylphenylmethoxy Benzoate | 48 | grams |
| Pentylphenylpentyloxy Benzoate | 32 | grams |
| Cyanophenylpentyl Benzoate | 5.17 | grams |
| Cyanophenylheptyl Benzoate | 7.75 | grams |
| Cyanophenylpentyloxy Benzoate | 2.35 | grams |
| Cyanophenylheptyloxy Benzoate | 2.12 | grams |
| Cyanophenyloctyloxy Benzoate | 1.88 | grams |
| Cyanophenylmethoxy Benzoate | 0.705 | grams |
| 40% Material | | |
| Pentylphenylmethoxy Benzoate | 36 | grams |
| Pentylphenylpentyloxy Benzoate | 24 | grams |
| Cyanophenylpentyl Benzoate | 10.35 | grams |
| Cyanophenylheptyl Benzoate | 15.52 | grams |
| Cyanophenylpentyloxy Benzoate | 4.7 | grams |

| | | |
|---|---|---|
| -continued | | |
| Cyanophenylheptyloxy Benzoate | 4.23 | grams |
| Cyanophenyloctyloxy Benzoate | 3.76 | grams |
| Cyanophenylmethoxy Benzoate | 1.41 | grams |
| 40% MOD | | |
| Pentylphenylmethoxy Benzoate | 36 | grams |
| Pentylphenylpentyloxy Benzoate | 24 | grams |
| Cyanophenylpentyl Benzoate | 16 | grams |
| Cyanophenylheptyl Benzoate | 24 | grams |

The encapsulating medium forming respective capsules 32 should be of a type that is substantially completely unaffected by and does not affect the liquid crystal material. Various resins and/or polymers may be used as the encapsulating medium. A preferred encapsulating medium is polyvinyl alcohol (PVA), which has a good, relatively high, dielectric constant and an index of refraction that is relatively closely matched to that of the preferred liquid crystal material. An example of preferred PVA is an about 84% hydrolized, molecular weight of at least about 1,000, resin. Use of a PVA of Monsanto Company identifies as Gelvatol 20/30 represents the best mode of the invention.

A method for making emulsified or encapsulated liquid crystals 11 may include mixing together the containment or encapsulating medium, the liquid crystal material, and perhaps a carrier medium, such as water. Mixing may occur in a variety of mixer devices, such as a blender, a colloidal mill, which is most preferred, or the like. What occurs during such mixing is the formation of an emulsion of the ingredients, which subsequently can be dried eliminating the carrier medium, such as water, and satisfactorily curing the encapsulating medium, such as the PVA. Although the capsule 32 of each thusly made encapsulated liquid crystal 11 may not be a perfect sphere, each capsule will be substantially spherical in configuration because a sphere is the lowest free energy state of the individual droplets, globules or capsules of the emulsion, both when originally formed and after drying and/or curing. Moreover, if the dye used is a water soluble one, it should be pre-mixed and/or dissolved in the water base material or medium, such as the PVA containment medium; and if the dye is oil soluble, then it should be pre-mixed and/or dissolved in the oil base component, such as the liquid crystal material.

The capsule size (diameter) preferably should be uniform in the emulsion for uniformity of operation with respect to effect on incident light and response to electric field. Exemplary capsule size range may be from about 0.3 to about 100 microns, preferably 0.3 to 30 microns, especially 3 to 15 microns, for example 5 to 15 microns.

Various techniques may be employed to form the support medium 12, which may be of the same or similar material as the encapsulating or containment medium. For example, the lower support medium 12b may be formed using a molding or casting process. The electrode 13 and liquid crystal material may be applied for support by that medium 12b. The electrode may be a layer of Intrex material between the support medium and the encapsulated liquid crystal material. The electrode 14 may be applied, e.g. by printing. Thereafter, the upper support medium portion 12a may be poured or cast in place to complete enclosing the encapsulated liquid crystal material and the electrodes. Alternatively, the support medium portions 12a, 12b may be a substantially transparent plastic-like film or a plate of glass, as is described in Example 1, for example. Most preferably the support medium portions 12a and 12b are a polyester film, such as Mylar.

The reflectance medium 18, of a solid, for example, may be applied to the support medium portion 12b by a further casting or molding technique, and a lower coating 21 of black or colored light absorbing material may be applied to the back surface of the reflectance medium 18, i.e. the surface remote from the interface thereof with the lower support medium portion 12b. Alternatively, the reflectance medium may be an air or other fluid gap between the support medium portion 12b and the absorber 21, or a tuned dielectric layer may be applied by conventional evaporation technique directly to the bottom surface of the lower support medium portion 12b in place of the reflectance medium 18, as will be described further below.

The following is an example of materials and one method for making liquid crystal display devices and operational characteristics thereof in accordance with the present invention.

EXAMPLE 1

An example of dyed isotropically scattering material was made using 15 grams of 22% (the other 78% was water) solution of low viscosity medium hydrolysis polymer (Gelvatol polyvinyl alcohol - PVA), 5 grams of the above 40% recipe liquid crystal material, 3% cholesteryl oleate, 0.1% LO 630 1% solution (i.e.the amount of the LO 630 was about 0.1% of the weight of the liquid crystal material), 15% choloroform (0.75 grams), and 0.4% (i.e. 0.06 grams) of M.C. Green liquid dye.

The dye was dissolved in the PVA and then all the above ingredients were combined. The mixture was passed through a screen filtering system on low vacuum insert screens CBB and AA which filtered the material very slowly into a small filtering mask.

A slide was made of the filtered emulsified material. On observation through a microscope after the material had dried the capsules were measured at about 3 to 4 microns diameter.

A film of such emulsified material was pulled using a doctor blade at a gap 5 setting on an Intrex electrode mounted on a clear Mylar film support. The emulsion film was allowed to dry. In operation the stable emulsion film scattered light in the absence of an electric field, began to transmit light (i.e. to align the liquid crystal structure with respect to an electric field) at a voltage of about 10 volts, and was full on (transmitting) at about 30 volts.

EXAMPLE 2

The ingredients and method of Example 1 were followed except a 0.4% of M.C. Blue liquid dye was substituted for the Green dye. The results were the same.

To improve the emulsion stability and coating uniformity the GAF Corporation LO 630 non-ionic surfactant (detergent) was added before the mixing step. Improved performance in stability of the emulsion and in coating of the emulsion onto the electrode/polyester film base were noted.

Thus, it will be appreciated that in accordance with the invention a surfactant, preferably a non-ionic surfactant, a detergent, or the like may be mixed with the encapsulated liquid crystal material prior to depositing on the electrode coated film, as was just described above.

The chiral additive (cholesteryl oleate) noted in the examples above improved (reduced) the response time of the operationally nematic encapsulated liquid crystal material, particularly in returning to the distorted alignment generally following the wall shape of the individual capsules, promptly after going from a field on to a field off condition. In relatively large capsules, say about on the order of at least 8 microns total diameter, when going to the field off condition, it is the usual case that the liquid crystal material adjacent the capsule wall would return to the distorted alignment following the capsule wall shape or curvature faster than would the liquid crystal material closer to the center of the capsule; this disparity tends to slow the overall response time of the material. However, the chiral additive induces a tendency for the structure to twist. This influence on the nematic material is most noticeable remote from the capsule wall and, thus, speeds up the return of such relatively remote material to distorted alignment, preferably influenced by the shape of the capsule wall. Such chiral additive may be in the range of about 0.1% to about 8% of the liquid crystal material and a preferred range of about 2% to about 5%. The amount may vary depending on the additive and the liquid crystal and could even be outside the stated range as long as the capsule remains operationally nematic.

Another additive, namely the chloroform, noted in the above examples also may be used to reduce and/or otherwise to control the viscosity of the liquid crystal during manufacturing of a device 60, for example. The reduced viscosity may have a positive effect on emulsion formation and/or on the process of applying the emulsion to an electrode covered support medium 12. The chloroform, which is water-soluble, leaves the emsulsion on drying.

In accordance with the invention, other types of support media 12 that may be used include polyester materials; and polycarbonate material, such as Kodel film. Tedlar film, which is very inert, also may be used if adequate adhesion of the electrode can be accomplished. Such media 12 preferably should be substantially optically transparent.

Another example of an acid type containment medium useful in the invention is carbopole (carboxy polymethylene polymer by B. F. Goodrich Chemical Company), or polyacid.

In accordance with the invention, several other polymer containment media that may be used are listed in Chart I below. The chart also indicates several characteristics of the respective polymers.

CHART I

| Containment Medium | Viscosity | % Hydrolyzed | Molecular Weight | Temperature & % Solutions |
|---|---|---|---|---|
| 20/30 Gelvatol, by Monsanto Company | 4–6 CPS | 88.7–85.5 | 10,000 | 4% at 20° C. |
| 40/20 Gelvatol, by Monsanto Company | 2.4–3 CPS | 77–72.9 | 3,000 | 4% at 20° C. |
| 523, by Air Products And Chemicals, Inc. | 21–25 | 87–89 | — | 4% at 20° C. |
| 72/60 Elvanol, by DuPont Co. | 55–60 | 99–100 | — | 4% at 20° C. |
| 405 | 2–4 CPS | 80–82 | — | 4% at 20° C. |
| Poval, by Kurashiki | | | | |

Other Gelvatol PVA materials that may be used include those designated by Monsanto as 20-90; 9000; 20-60; 6000; 3000; and 40-10.

A preferred quantity ratio of liquid crystal material to containment medium is about one part by weight liquid crystal material to about three parts by weight of containment medium. Acceptable encapsulated liquid crystal emulsion operative according to the invention also may be achieved using a quantity ratio of about one part liquid crystal material to about two parts containment medium, e.g. Gelvatol PVA. Moreover, although a 1:1 ratio also will work, generally it will not function quite as well as material in the ratio range of from about 1:2 to about 1:3.

Turning now to FIGS. 4 and 5, a portion 60 of a liquid crystal display device in accordance with the present invention is illustrated. The portion or device 60 is a completion of the liquid crystal apparatus 10 described above with reference to FIG. 1 in that plural encapsulated liquid crystals 11, indeed plural layers thereof, are contained in a support medium 12. The sizes, thicknesses, diameters, etc., of the several parts shown in FIGS. 4 and 5 are not necessarily to scale; rather the sizes are such as is necessary to illustrate the several parts and their operation, as is described below, in accordance with the invention.

The electrods 13, 14 are employed to apply a desired electric field to effect selective alignment of the liquid crystal material in the manner shown in FIG. 3, for example. Means other than electrodes may be employed to apply some type of input to the display device 60 for the purpose of effecting ordered or random alignment of the liquid crystal.

The encapsulated liquid crystals 11 are arranged in several layers 61 within the display portion 60. The layers 61 may be divided into several portions representing the various characters or portions of characters intended to be displayed by the display 60. For example, the longer lefthand portion 61L of the layers 61 shown in FIG. 5 may represent a section view through one part of a well known 7-segment display pattern; and the relatively short righthand portion 61R of the layers 61 shown in FIG. 4 may represent a part of another 7-segment character display. It will be appreciated, though, that various patterns of liquid crystal material may be employed in accordance with the present invention. A zone 62 of support medium 12 fills the area between the liquid crystal layer portions 61L, 61R. Subsequent reference to layers 61 will be in the collective, i.e. referring to layer 61 as including the several levels or layers comprising the same. As an example, the composite thickness of such layer 61 may be from about 0.3 mils to about 10 mils; uniform thickness is preferred for uniform response to electric field, scattering, etc.

It is significant to note that such an arrangement or pattern of encapsulated liquid crystal material layer portions, such as at 61L and 61R, separated at zone 62 by support medium 12 or other material is facilitated, or even made possible due to the encapsulating or confining of the liquid crystal in discrete containment media, such as is formed by the preferred stable emulsion. Therefore, especially on a relatively large size device such as a display, billboard, optical shutter, etc., encapsulated liquid crystal material may be applied to the support medium 12 only where it is required to provide the selectable optical characteristics. Such patterning of the encapsulated liquid crystal material can in some instances, then, appreciably reduce the amount of such material required for a particular application. Such patterning is further made possible consistent with desired operation of a device using encapsulated liquid crystal material in accordance with the invention due to the functional operation thereof as will be described in detail below.

The display 60 may be used, for example, in an air environment, such air being represented by the reference numeral 63, and the air forms an interface 64 at the viewing side or from the viewing direction 20 with the support medium 12. The index of refraction N of the external medium 63 is different from the index of refraction N' of the encapsulating medium 12, the latter usually being larger than the former. As a result, a beam of light 65, which arrives generally from the viewing direction 20, passing through the interface 64 into the support medium 12 will be bent toward the normal, which is an imaginary line 66 perpendicular to that interface 64. That light beam 65a inside the support medium 12 will be closer to normal than the incident beam 65 satisfying the equation relationship N Sine $\theta$=N' Sine $\theta'$, wherein $\theta$ is the angle of the incident light beam 65 with respect to the normal and $\theta'$ is the angle of the light beam 65a with respect to normal. Such mathematical relationship will apply at the interface 19, as follows: N' Sine $\theta'$ =N" Sine $\theta''$. To achieve the desired total internal reflection in accordance with the invention, the index of refraction N" of the reflectance medium 18 is smaller than the index of refraction N' of the support medium 12. Accordingly, if the light beam 65a, for example, were able to and did pass through the interface 19, it would be bent away from the normal at the interface 19 to the angle $\theta''$ with respect to normal. Actually, since the light beam 65, 65a is not scattered off course by the liquid crystal material in layers 61, i.e., because it passes through the zone 62, it will indeed likely exit through the interface 19.

Continuing to refer particularly to FIG. 4, operation of a liquid crystal display 60 in accordance with the invention is now described. The operationally nematic liquid crystal 30 is in distorted or random alignment due to existence of a field-off condition. Incident light beam 70 enters the support medium 12 at the interface 64 and is bent as the light beam 70a that impinges as incident light on the layer 61 of encapsulated liquid crystal. The random or distorted encapsulated liquid crystal material will isotropically scatter the light incident thereon. Therefore, there are several possibilities of how such incident light beam 70a would tend to be scattered, as follows:

A. For example, one possibility is that the incident light beam 70a will be directed according to the dotted line 70b toward the interface 19. The angle at which the light beam 70b impinges on the interface 19 is within the illustrated solid angle $\alpha$ (defined in the planar direction of the drawing of FIG. 4 by the dashed lines 71) of a so-called cone of illumination. Light falling within such solid angle $\alpha$ or cone of illumination is at too small an angle with respect to normal at the interface 19 to be totally internally reflected at that interface; therefore, the light beam 70b will pass through interface 19 while bending away from the normal to form the light beam 70c. Light beam 70c passes into the reflectance medium 18 and is absorbed by layer 21.

B. Another possibility is that the light beam 70a will be isotropically scattered in the direction of the light beam 70d outside the cone angle $\alpha$. Total internal reflection will occur at the interface 19 causing the light beam 70d to be reflected as light beam 70e back to the layer 61 of encapsulated liquid crystal material where it will be treated as another independently incident light beam thereto, just like the light beam 70a from which it was derived. Therefore, such light beam 70e will undergo isotropic scattering again as is described herein.

C. Still another possibility is that the incident light beam 70a, or that derived therefrom, such as the light beam 70e, will be isotropically scattered toward the interface 64 at an angle that is so close to normal at that interface 64 that the light beam will pass through the interface 64 into the "medium" 63, such as the air, to be viewed by an observer or observing instrument. The solid angle $\alpha'$ of a cone of illumination, like the cone angle $\alpha$ mentioned above, within which such scattered light beam 70e must fall to be emitted out through the interface 64 is represented by the single dot phantom lines 72. Light beam 70f represents such a light beam that is so emitted from the display 60. It is that light, e.g. the sum of such emitted light beams 70f, which exits at the interface 64 that causes the layer 61 of encapsulated liquid crystals 11 to give the appearance of a colored bright character as viewed from the viewing direction 20.

D. Still a further possibility is that the light beam 70a may be isotropically scattered in the direction of the light beam 70g. Light beam 70g is outside the solid cone angle $\alpha'$ and, therefore, will undergo total internal reflection at the interface 64, whereupon the reflected beam 70h will impinge back on the layer 61 as an effectively independent incident light beam, like the beam 70e mentioned above and having a similar effect.

The index of refraction of the electrodes 13,14 usually will be higher than that (those) of the containment medium and support medium and the containment and support media indices of refraction preferably are at least about the same. Therefore, the light passing from the containment medium into the electrode material will bend toward the normal, and that passing from the electrode into the support medium will bend away from the normal; the net effect of the electrode thus being nil or substantially negligible. Accordingly, the majority of total internal reflection will occur at the interfaces 19,64.

As viewed from the viewing direction 20, the zone 62 will appear dark or colored according to the composition of the absorbent layer 21. This is due to the fact that the light beam 65, 65a, 65b, representing the majority of light that passes through zone 62, will tend to pass through inteface 64, support medium 12, the interface 19 and the reflectance medium 18, being bent toward or away from the normal, at respective interfaces as shown, ultimately being substantially absorbed by layer 21.

Briefly referring to FIG. 5, the field-on or ordered alignment condition and operation of the encapsulated liquid crystal layer 61 in the display device 60 are shown. The encapsulated liquid crystals 11 in the layer 61 of FIG. 5 are like those seen in FIG. 3. Therefore, like the light beam 65, 65a, 65b which passes through the zone 62 and is absorbed by the layer 21, the light beam 70, 70a, 70i will follow a similar path also being transmitted through the aligned and, thus, effectively transparent or non-scattering layer 61. At the interface 19, the light beam 70a will be bent away from the normal and subsequently light beam 70i will be absorbed by the layer 21. Accordingly, whatever visual appearance the light beam 65 would tend to cause with respect to an observer at the viewing location 20, so too will the light beam 70 cause the same effect when passing through the orderly aligned encapsulated liquid crystal material. Thus, when the display 60, and particularly the encapsulated liquid crystal material therein, is in the orderly aligned or field-on condition, the area at which the liquid crystal is located will have substantially the same appearance as that of the zone 62.

It is noted that if either the incident beam 65 or 70 were to enter the support medium 12 at the interface 64 at such a large angle with respect to the normal there, and, therefore, ultimately to impinge on the interface 19 at an angle greater than one falling within the so-called cone of light angle α, such beam would be totally internally reflected at the interface 19. However, such reflected light probably would remain within the support medium 12 due to subsequent transmission through the layer of liquid crystal material 61 and subsequent total internal reflectance at the interface 64, etc.

In FIG. 6, the preferred reflectance medium 80 air is illustrated. In FIG. 6 primed reference numerals designate elements corresponding to those designated by the same unprimed reference numerals in FIGS. 4 and 5. The display 60' has an interface 19' formed with air 80. To achieve absorbence of the light transmitted through the interface 19' and medium 80, a black or colored absorber 81 may be positioned at a location displaced from the interface 19'. The preferred absorber 81 is carbon black which may be mounted on a support surface positioned generally as is shown in FIG. 6. The preferred liquid crystal is NM-8250 and the preferred containment medium is PVA, as are mentioned above; and the preferred support medium 12 is polyester. Moreover, it is preferred that the index of refraction of the support medium 12a, 12b, for example, and that of the containment medium for the liquid crystal be at least substantially the same; this helps to assure that the total internal reflection will occur primarily at the interfaces 19', 64' and not very much, if at all, at the interface between the containment medium and support medium; this minimizes optical distortion while maximizing contrast. The display 60' functions substantially the same as the display 60 described above with reference to FIGS. 4 and 5.

Referring, now, to FIGS. 7 and 8, a modified liquid crystal display 90 is illustrated. The liquid crystal display 90 includes a support medium 12 with a layer of encapsulated liquid crystal material 61, as above. However, at the interface 19 there is a tuned dielectric interference layer 91. The thickness of the dielectric layer 91, which is exaggerated in the drawings, preferably is an odd whole number function or multiple of lambda divided by two such as 3α/2, 5α/2, etc., wherein α is the wavelength of the light in the support display 60. The tuned dielectric interference layer 91 may be applied to the back surface of the support medium 12 by conventional evaporation technique. Such dielectric layer may be comprised of barium oxide (BaO), lithium fluoride (LiF) or other material that provides the desired optical interference function. Preferably such layer has a smaller index or refraction than the medium 12 to obtain an interface 19 at which total internal reflection of light within cone angle α will be internally reflected. A comprehensive description of optical interference is found in *Optics* by Born and Wolf, *Fundamentals of Physics*, 2nd Ed., 1981, Resnick and Halliday, pgs. 731–735, and in *University Physics* by Sears and Zemansky, the relevant disclosures of which are hereby incorporated by reference.

In the field-off/random liquid crystal alignment condition shown in FIG. 7 the display 90 will function substantially the same as the display 60 described above with respect to: (a) isotropic scattering of light by the encapsulated liquid crystal material layer 61; (b) the total internal reflection of that light falling outside the solid angle cone α, this due to the interface 19 seen in FIG. 7, (or α' with respect to light isotropically scattered to the interface 64), and; (c) the transmitting of light, such as the light beam 70f, toward the viewing direction 20 to give the appearance of a white character on a relatively dark background.

By use of the tuned dielectric interference layer 91 and optical interference, in the field-off condition the illumination effected of the encapsulated liquid crystal layer 61 is further enhanced. Specifically, the effective cone of light angle α becomes reduced to the angle φ shown in FIG. 7. Generally, an incident light beam 92 impinging on the interface 64 will be deflected as the light beam 92a which then is incident on the layer 61. If the light beam 92a were isotropically scattered as beam 92b at an angle outside the original angle α, the total internal reflection operation described above with reference to the display 60 will occur. However, if the light beam 92a is isotropically scattered as light beam 92c at an angle falling within the cone of light α but outside the cone of light φ, it will actually be reflected constructive optical interference will occur further to enhance the illumination of the encapsulated liquid crystal layer 61.

More particularly when the light beam 92c enters the tuned dielectric interference layer 91, at least a portion 92d actually will be reflected back toward the interface 19. At the interface 19, there will be constructive interference with another incident light beam 93 increasing the effective intensity of the internally reflected resultant light beam 94, which is directed back toward the encapsulated liquid crystal layer 61 enhancing the illumination thereof. The result of such constructive interference is that the display 90 yields more light beams scattered up to or reflected up to the layer 61 than in the display 60. However, there is a disadvantage in that the viewing angle at which the display 90 will function effectively is less than the viewing angle at which the display 60 will function effectively. Specifically, incident light entering the support medium 12 at an angle equal or less than the angle δ with respect to the interface 64, will tend to be totally reflected because the back or reflective surface of the tuned dielectric interference layer 91 will tend to act as a mirror so that some contrast will be lost in the display 90. The angle δ, if it exists at all, in connection with the display 60 would tend to be smaller than the angle of the display 90.

Light beams 95 and 96 (FIG. 7) that pass through the zone 62 of the display 90 and light beams 92' (FIG. 8) that pass through the orderly aligned (field-on) liquid crystal layer 61 and fall within the cone angle O will undergo destructive optical interference. Therefore, from the viewing area 20 the zone 62 and the area where there is ordered field-on liquid crystal will appear relatively dark, i.e. as a dark background relative to the brightly colored illuminated liquid crystal layer 61 portion that is field-off and scattering. If desired, an absorber (black or colored) may be used beyond the layer 91. Also, the color of background may be altered as a function of the thickness of the layer 91.

Turning now to FIG. 9, an example of a liquid crystal device 100 in accordance with the invention is shown in the form of a liquid crystal display device, which appears as a square cornered figure eight 101 within the substrate or support medium 12, which in this case preferably is a plastic material, such as Mylar, or may alternatively be another material, such as glass, for example. The shaded area appearing in FIG. 9 to form the square cornered figure eight is comprised of one or more layers 61 of encapsulated liquid crystals 11 arranged in one or more layers on and adhered to the substrate 12. An enlarged fragmentary section view of a portion of the figure eight 101 is illustrated in FIG. 4 as the display 60, 60' or 90 described above with reference to FIGS. 4–8.

Each of the seven segments of the figure eight 101 may be selectively energized or not so as to create various numeral characters. For example, energization of the segments 101a and 101b would display the numeral "1" and energization of the segments 101a, 101b, 101c would display the numeral "7". What is meant by energization here is the placing of the respective segments in a condition to appear as a bright color relative to background. Therefore, energization means field-off or random alignment condition of, for example, segments 101a and 101b to display "1" while the other segments are field-on, ordered alignment.

Figure 10:
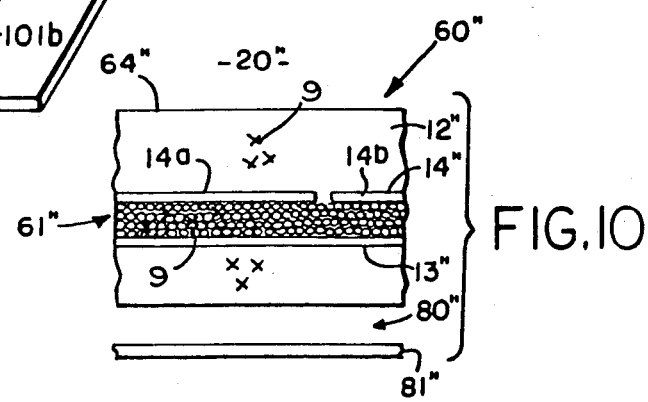
FIG. 10 is a fragmentary schematic elevation view of another embodiment of liquid crystal apparatus using continuous layers of liquid crystal material and interrupted electrodes.
Figure 11:
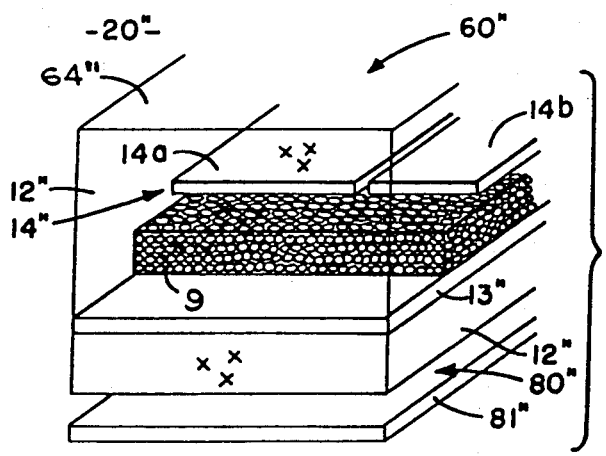
FIG. 11 is a schematic isometric view, partly broken away, of the embodiment of FIG. 10.

FIGS. 10 and 11 illustrate, respectively in fragmentary section and fragmentary isometric-type views, an embodiment of the invention representing the preferred arrangement of the liquid crystal layer 61'' and electrodes 13'', 14'' in the support medium 12''. In FIGS. 10 and 11, double primed reference numerals designate parts corresponding to those designated by unprimed reference numerals in FIGS. 4 and 5, or primed reference numerals in FIG. 6. In particular, it is preferred according to the illustration of FIGS. 10 and 11 that the display device 60'' have the layer 61'' and the electrode 13'' substantially continuous over the entire or at least a relatively large portion of a display device. The electrode 13'' may be connected, for example, to a source of electrical ground potential. The electrode 14'' may be divided into a plurality of electrically isolated electrode portions, such as those represented at 14a, 14b, each of which may be selectively coupled to a source of electric potential to complete application of an electric field across that liquid crystal material which is between such energized electrode portion 14a or 14b and the other electrode 13''. Therefore, for example, an electric field may be applied across the electrodes 14a, 13'' causing the encapsulated liquid crystal material falling substantially directly therebetween to be in ordered, field-on alignment and, thus, effectively optically transparent in the manner described above. At the same time, it may be that the electrode 14b is not connected to a source of electric potential so that the liquid crystal material between such electrode 14b and the electrode 13'' will be in distorted or random alignment and, therefore, will appear relatively bright from the viewing direction 20''. A smal gap 120 between electrodes 14a, 14b provides electric isolation therebetween to permit the just-described separate energization or not thereof.

Figure 12:
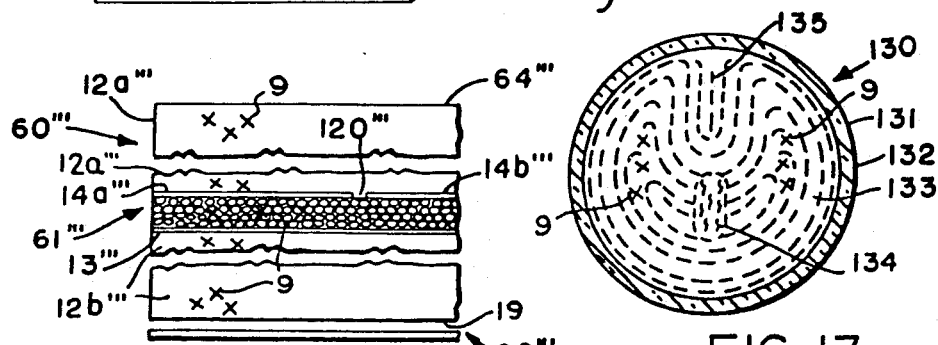
FIG. 12 is a schematic view of an approximately proportioned liquid crystal display according to the invention showing a more accurately representative size relationship of the support medium layers and encapsulated liquid crystal layer for the several embodiments herein.

Briefly referring to FIG. 12, the preferred embodiment and best mode of the present invention is shown as the display 60'''. In FIG. 12 the various portions designated by triple primed reference numerals correspond to those portions designated by similar reference numerals, as are described above. The display device 60''' is made generally in accordance with the numbered examples presented above. In particular, the lower support medium 12b''' is formed of Mylar film having an indium doped tin oxide Intrex electrode 13''' thereon; and the layer 61''' of encapsulated liquid crystal material was applied to the electrode coated surface, as is shown. Several electrode portions 14a''', 14b''', etc. with a respective gap 120''' therebetween were applied either directly to the surface of the layer 61''' opposite the support medium 12b''' or to the support medium 12a''', and the latter was applied in the manner shown in FIG. 12 to complete a sandwich of the display device 60'''. Moreover, the reflectance medium 80''' was air, and a carbon black absorber 21''' mounted on a support shown in FIG. 12 was placed opposite such air gap 80''' from the support medium 12b''', as can be seen in the figure. Operation of the display device 60''' is according to the operation described above, for example, with reference to FIGS. 4–6 and 10.

Figure 13:
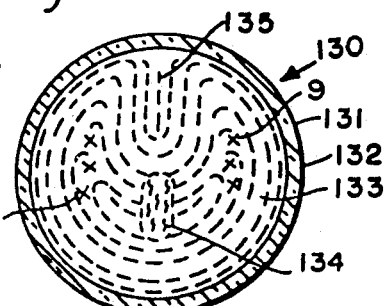
FIG. 13 is a schematic illustration of a nematic liquid crystal capsule with cholesteric material additive, which may be used with the several embodiments herein.

Referring to FIG. 13, an encapsulated liquid crystal 130 of the type described herein is schematically shown. Such capsule 130 includes a spherical capsule wall 131 of containment material 132, operationally nematic liquid crystal material 133 inside the capsule, and a cholosteric chiral additive 134. The additive 134 is generally in solution with the nematic material 13, although the additive is shown in FIG. 13 at a central location because its function primarily is with respect to the liquid crystal material remote from the capsule wall, as is described further below. The capsule 130 is shown in field-off, distorted condition with the liquid crystal material distorted in the manner described above, for example, with reference to FIG. 2. The liquid crystal material most proximate the wall 131 tends to be forced to a shape curved like the inner boundary of that wall, and there is a discontinuity 135 analogous to the discontinuity 55 shown in FIG. 2.

It will be appreciated that the encapsulated liquid crystal 130 of FIG. 13 may be substituted in various embodiments of the invention described in this application in place of or in conjunction with the otherwise herein described encapsulated liquid crystal material. Operation would be generally along the lines described in Examples 1 and 2, for example.

A modified liquid crystal display device 140 in accordance with the present invention is shown schematically in FIGS. 14 an 15. In the device 140 the primary source of illumination is derived from a light source 141 at the so-called back or non-viewing side 142 of the display device. More specifically, the display device 140 includes a layer 61 of encapsulated liquid crystal between a pair of electrodes 13, 14 supported on upper and lower support media 12a, 12b generally in the manner disclosed above, for example with reference to FIG. 12. The reflectance medium 80 is an air gap, as was described in connection with the preferred embodiment above.

A light control film (LCF) sold by 3-M Company is shown at 143; the one preferred is identified by product designation LCFS-ABRO-30°-OB-60°-CLEAR- GLOS-0.030. The light control film 143 is a thin plastic sheet preferably of black substantially light absorbing material that has black micro-louvers 144 leading therethrough from the back surface 145 toward the front surface 146 thereof. Such film or like material may be used in connection with the various embodiments of the invention. Such film may in effect tend to collimate the light passing therethrough for impingement on the liquid crystal material.

The micro-louvers function like a venetian blind to direct light from the source 141, for example light beams 150, 151, into and through the display device 140, and particularly through the support medium 12 and liquid crystal layer 61, at an angle that would generally be out of the viewing angle line of sight of an observer looking at the display device 140 from the viewing distortion 20— this when the liquid crystal is aligned or substantially optically transparent. Such field-on aligned condition is shown in FIG. 14 in which the light beams 150, 151 pass substantially through the display device 140 out of the line of view. Moreover, light, such as light beam 152, incident on the display device 140 from the viewing direction 20 will generally pass through the support medium 12 and aligned, field-on liquid crystal layer 61 for absorption by the black film 143, which functions as the absorber 21''' in connection with FIG. 12, for example.

However, as is seen in FIG. 15, when the liquid crystal layer 61 is in the field-off condition, i.e. the liquid crystal is distorted or randomly aligned, the light beams 150, 151 from the source 141 are isotropically scattered by the layer of liquid crystal material 61 causing total internal reflection and brightened colored appearance of the liquid crystal material in the manner described above. Thus, for example, the beam 151 is shown being isotropically scattered as beam 151a, totally internally reflected as beam 151b, and being further isotropically scattered as beam 151c which is directed out through the interface 64 toward the viewing direction 20. The display device 140 of FIGS. 14, 15 is particularly useful in situations where it is desirable to provide lighting from the back or non-viewing side. However, such display device also will function in the manner described above, for example with respect to the display device 60''' of FIG. 12, even without the back light source 141 as long as adequate light is provided from the viewing direction 20. Therefore, the device 140 may be used in daylight, for example, being illuminated at one or both sides of ambient light with or without the light source 141, and at night or in other circumstances in which ambient lighting is inadequate for the desired brightness, for example, by using the illumination provided from the source 141.

A display device 160 in FIG. 16 is similar to the display device 140 except that the light control film 161 is cemented at 162 directly to, or is otherwise placed in abutment with the support medium material 12b. Total internal reflection would occur in the manner described above when the display device 160 is illuminated with light from the viewing direction 20 due primarily to the interface 64 of the support medium 12a with air. There also may be some total internal reflection at the interface 162. However, since the LCF film is directly applied to the support medium 12b, a relatively large quantity of the light reaching the interface 162 will be absorbed by the black film. Therefore, in the display device 160 it is particularly desirable to supply a black lighting source 141 to assure adequate illumination of the liquid crystal material in the layer 61 for achieving the desired bright colored character display function in accordance with the invention.

Briefly referring to FIG. 17, there is shown an alternate embodiment of encapsulated liquid crystal material 200, which may be substituted for the various other embodiments of the invention disclosed herein. The encapsulated liquid crystal material 200 includes operationally nematic liquid crystal material 201 in a capsule 202 having preferably a generally spherical wall 203. In FIG. 17 the material 200 is in field-off condition, and in that condition the structure 204 of the liquid crystal molecules is oriented to be normal or substantially normal to the wall 203 at the interface 205 therewith. Thus, at the interface 205 the structure 204 is generally oriented in a radial direction with respect to the geometry of the capsule 202. Moving closer toward the center of the capsule 202, the orientation of the structure 204 of at least some of the liquid crystal molecules will tend to curve in order to utilize, i.e. to fill, the volume of the capsule 202 with a substantially minimum free energy arrangement of the liquid crystal in the capsule, for example, as is seen in the drawing.

Such alignment is believed to occur due to the addition of an additive to the liquid crystal material 201 which reacts with the support medium to form normally oriented steryl or alkyl groups at the inner capsule wall. More particularly, such additive may be a chrome steryl complex or Werner complex or other material that reacts with PVA of the support medium (12) that forms the capsule wall 203 to form a relatively rigid crust or wall with a steryl group of moeity tending to protrude radially into the liquid crystal material itself. Such protrusion tends to effect the noted radial or normal alignment of the liquid crystal structure. Moreover, such alignment of the liquid crystal material still complies with the above strongly curved distortion of the liquid crystal structure in field-off condition because the directional derivatives taken at right angles to the general molecular direction are non-zero.

Briefly referring to FIG. 18 there is illustrated an embodiment of the invention in which the dye is of the fluorescent type. Exemplary fluorescent dyes may be an oil soluble fluorescent dye D-250 and a water soluble fluorescent dye may be that identified by the number D-834. In FIG. 18 the oil soluble fluorescent dye 9F is shown in the oil base liquid crystal material 30, and water soluble fluorescent dye 9F is shown in the containment medium 33 and in the support medium 12. However, most preferably the fluorescent dye is in the containment medium; less preferably in the liquid crystal material, and least preferably in the support medium. However, the fluorescent dye may be in more than one of such media or material.

Fluorescence is radiation caused by incident radiation. According to the preferred embodiment and best mode of the invention, the fluoresced radiation or emitted radiation by the fluorescent dye is in or near the visible light wavelengths. The light emitted by a fluorescing material generally is emitted in an isotropic manner, i.e. it may not be possible to predict the direction of the emitted light in response to incident light.

Referring particularly to FIG. 18, operation of the liquid crystal device 360 may be substantially the same as the other devices or displays described above with reference to the several figures. However, in response to an incident light beam, a fluorescent dye molecule or particle will tend to fluoresce or to emit light itself, and this will occur at the same time that the liquid crystal material in the layer 361 is isotropically scattering light. In effect, then, there is a build-up of light level in the device 360, particularly when the liquid crystal material in the layer 361 is in the scattering aligned mode, almost charging up in a manner analogous to operation of a laser. Accordingly, the brightness, intensity, contrast, and/or other characteristics of the output light represented at 380 in FIG. 18 and viewed from the viewing direction 320 is further enhanced. It will be appreciated that during such operation the light isotropically scattered by the distorted liquid crystal material and the emitted or fluoresced light will be totally internally reflected in the manner described above at the front and/or back interfaces of the device 360 to achieve the desired brightness. Also, that fluorescent dye which may be located in the support medium and/or in the containment medium material that itself either is in the transmissive mode or does not have therein liquid crystal material, for example, as indicated at the zone 362 in FIG. 18, and that light from such dye, or at least most of that light, will be totally internally reflected at the respective interfaces, as was described above. Therefore, such light either will be trapped in the support medium 312 (except for the small quantity thereof that may be transmitted to the viewing direction 320, as above), or, alternatively, such fluoresced light may be directed by total internal reflection into distorted, scattering encapsulated liquid crystal material 311 in a layer 361 providing a further input thereto and, thus, brightening thereof.

EXAMPLE 3

The ingredients and method described above in Example 1 were employed, except that 0.4% (0.02 grams) of D-250 oil soluble flourescent dye was mixed with the oil base liquid crystal material before all of the ingredients were combined. After the screening of the material, as was described above, a slide was taken. The slide was dried and under a microscope it appeared that the capsules had a size of from about 3 to about 4 microns. Moreover, a film of the thusly formed emulsion was pulled using a doctor blade set at a gap 5 setting; such film was applied to a Mylar substrate having an Intrex electrode thereon. In operation, full scattering occurred prior to 8 volts of an electric field; at 8 volts scattering began to reduce; and at 25 volts saturation was achieved.

EXAMPLE 4

The ingredients and method described above in Example 1 were employed, except that 0.4% (0.06 grams) of D-834 water soluble fluorescent dye was mixed with the water base liquid crystal material before all of the ingredients were combined. After the screening of the material, as was described above, a slide was taken. The slide was dried and under a microscope it appeared that the capsules had a size from about 3 to about 4 microns. Moreover, a film of the thusly formed emulsion was pulled using a doctor blade set at a gap 5 setting; such film was applied to a Mylar substrate having an Intrex electrode thereon. In operation, full scattering occurred prior to 8 volts of an electric field; at 7 volts scattering began to reduce; and at 25 volts saturation was achieved.

EXAMPLE 5

The ingredients and method described in Example 3 were employed except that 0.4% Congo Red dye was substituted for the D-250 dye. The results were similar; threshold was at 9 volts, and saturation was at 30 volts.

The fluorescent dye may be used in and/or with the several other embodiments and features of the invention disclosed herein.

The invention may be used in a variety of ways to effect color display of data, characters, information, pictures, etc. or simply light control or both small and large scale. The invention envisions use of non-pleochroic dye in one or more of the media or materials described above, although most preferably according to the present best mode the dye is in the containment medium. According to one embodiment and best mode of the invention, the liquid crystal material is placed in the support medium 12 at only those areas where characters, etc., are to be formed. In the alternative, the layer 61 may extend across the entire support medium 12, and only those areas where characters are to be displayed will have electrodes for controlling field-on/field-off with respect to the proximate portions of the liquid crystal layer 61. As an optical shutter, the invention may be used to adjust the effective and/or apparent brightness of light viewed at the viewing side. Various other designs also may be employed, as may be desired, utilizing the enhanced scattering effected by the total internal reflection and/or optical interference principles in accordance with the present invention including, for example, optical shutters, billboards, etc., which may be considered included in the definition of "display" as used herein.

STATEMENT OF INDUSTRIAL APPLICATION

The invention may be used, inter alia, to produce a controlled optical display.

I claim:

1. A liquid crystal display comprising liquid crystal means for selectively isotropically scattering light or transmitting light, substantially transparent support medium means for supporting said liquid crystal means, and dye colorant in said support medium means for coloring light isotropically scattered in said support medium means.

2. The display of claim 1, said support medium means at least substantially fully enclosing said liquid crystal means on all sides as a containment medium.

3. The display of claim 1, said liquid crystal means being positioned in at least one layer in said support medium means in a pattern to display predetermined information.

4. The method of making a liquid crystal apparatus comprising placing an encapsulated liquid crystal material in or on a support medium, and placing a dye in at least one of such encapsulated liquid crystal material and support medium.

5. The method of claim 4, said placing a dye comprising placing a non-pleochroic dye.

6. The method of claim 4, further comprising applying a tuned dielectric interference layer to a surface of such support medium opposite the surface at which such support medium ordinarily is viewed.

7. The combination of operationally nematic liquid crystal material contained in a generally spherical capsule of encapsulating medium, said encapsulating medium having a wall, the ordinary index of refraction of said liquid crystal material being approximately the same as the index of refraction of the encapsulating medium, and non-pleochroic fluorescent dye in at least one of said liquid crystal material and encapsulating medium.

* * * * *